United States Patent

Kung

Patent Number: 5,442,706
Date of Patent: Aug. 15, 1995

[54] SECURE MOBILE STORAGE

[75] Inventor: Kenneth C. Kung, Cerritos, Calif.

[73] Assignee: Hughes Aircraft Company, Los Angeles, Calif.

[21] Appl. No.: 842,833

[22] Filed: Feb. 27, 1992

[51] Int. Cl.$^6$ ............................................. H04L 9/30
[52] U.S. Cl. ........................................ 380/30; 380/4; 380/22; 380/49; 380/50
[58] Field of Search ................... 380/4, 22, 23, 25, 30, 380/49, 50, 52, 24; 235/379, 380

[56] References Cited

U.S. PATENT DOCUMENTS 4,453,074  6/1984  Weinstein ..................... 380/230 X
4,670,857  6/1987  Rackman ........................... 380/4

Primary Examiner—Bernarr E. Gregory
Attorney, Agent, or Firm—W. K. Denson-Low

[57] ABSTRACT

A method of secure data transfer by physical transport of an electronic storage device wherein the sender, using a type 1 encryption/decryption algorithm, sequentially encrypts data, in any order, with the public key of the receiver and the private key of the sender and then stores then the encrypted data on the transportable electronic storage medium. The receiver, upon receipt of the transportable electronic storage medium, sequentially, in the reverse order of public key/private key use, decrypts using the type 1 encryption/decryption algorithm for said decryption, the data stored on the transportable electronic storage medium with the public key of said sender and the private key of the receiver to provide data in its state prior to by the sender.

4 Claims, 1 Drawing Sheet

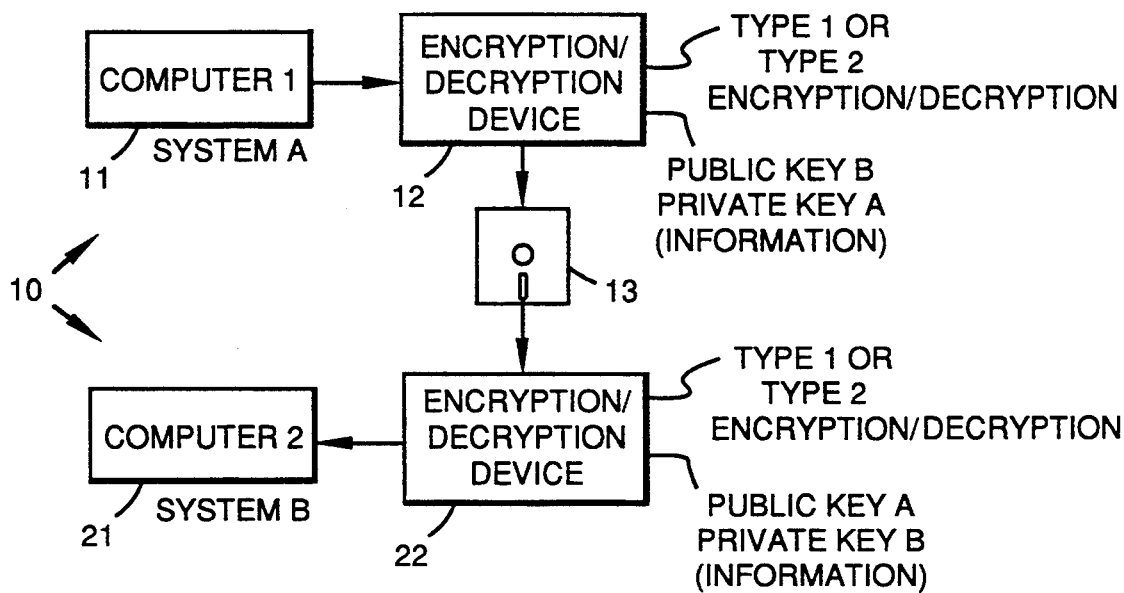
FIG. 1
FIG. 2
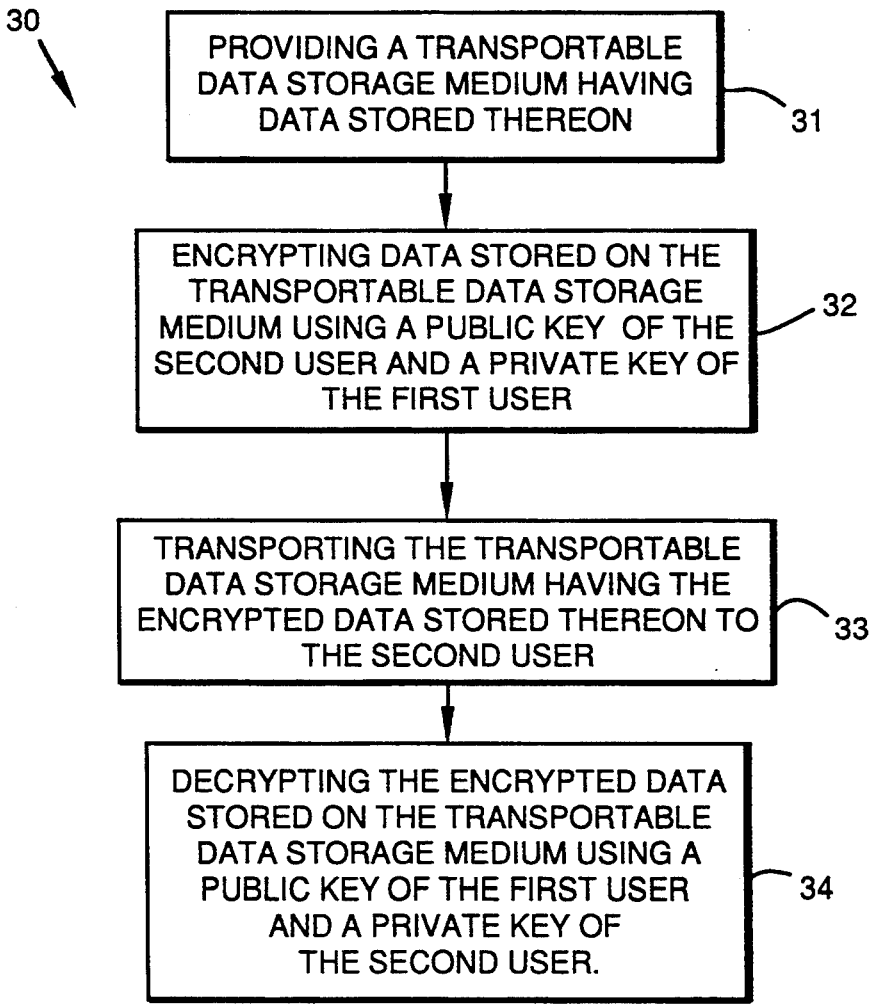

SECURE MOBILE STORAGE

BACKGROUND

The present invention relates generally to apparatus and methods for storing and transferring data in a secure manner, and more particularly, to apparatus and methods that provide for secure, mobile, data storage and transmission.

In a highly classified processing center, computers are typical not connected to a communication network. This precludes threats that attack the computers through the communication networks. Threats such as virus, worms, or Trojan horses cannot be introduced from a general network environment. However, information must be exchanged between computers.

When a classified storage media is transported from one location to another, the information is typically protected by physical security means. This may be inconvenient or not feasible. For example, the storage device can be locked in a carrying case which is in turn attached to the person transporting the case with key to open this case unavailable to him.

To physically carry classified information from a physically protected location in a conventional manner, it must be secured in proper container, and at all times be attended by a courier. This may be very inconvenient for the courier, and is expensive. If the content of the information is encrypted using a traditional symmetric key algorithm, then the difficulty is to distribute the key to all receiving sites ahead of the time. This involves many keys if the number of sites grow beyond a handful.

Therefore, it would be an advantage to have a secure data storage and transmission technique that precludes the necessity of transmitting numerous sets of keys to each location. In addition, it would be an advantage to have a secure data storage and transmission technique wherein the data storage media may be transmitted by commercial courier or U.S. Mail service to each location instead of by courier.

SUMMARY OF THE INVENTION

In order to provide for the above advantages, the present invention comprises apparatus and methods for physically transmitting data in a secure manner. The secure, mobile, data storage apparatus of the present invention comprises a first computer located at a first location and a transportable data storage medium. An encryption device is coupled to the first computer that is adapted to encrypt data stored on the transportable data storage medium using a public key known to the second user and a private key known to the first user. A second computer is located at the first location or second location. A decryption device is coupled to the second computer that is adapted to decrypt data stored on the transportable data storage medium using a public key known to the first user and a private key known to the second user.

The method of transmitting data between a first user and a second user in a secure manner in accordance with the present invention comprises the following steps. (1) Providing a transportable data storage medium having data stored thereon. (2) Encrypting data stored on the transportable data storage medium using a public key known to the second user and a private key known to the first user to provide for encrypted data stored on the medium. (3) Physically transporting the transportable data storage medium having the encrypted data stored thereon to the second user. (4) Decrypting the encrypted data stored on the transportable data storage medium using a public key known to the first user and a private key known to the second user.

The present invention is adapted to permit a novel use of public key encryption algorithm for securing information stored on media that may be transported to a different location without the need to carry any "key" for decryption. Information up to TOP SECRET/SCI may be carried from a protected facility as though it is unclassified information because the present invention employs an encryption algorithm provided by the National Security Agency which is used in transmitting classified information in public communication networks. The use of the present encryption/decryption techniques preclude the necessity of transmitting numerous sets of keys to each location (node a and node B). In addition, the storage media may be transmitted by commercial courier or U.S. Mail to each location.

Hence, using the algorithm employed in the present invention, the encrypted information can safely be carried out of a protected location without the usual physical and procedural complications associated with hand carrying classified information. Media to be transported include such items as a floppy disk or a large disk pack. At the destination site, a decryption key is derived from the available information transmitted on the media. Only the proper source and the proper destination have the ability to derive the encryption and decryption key. In addition to using the algorithm for encrypting information to be carried in communication networks, it may also be used for file encryption. The present invention thus offers additional services and capabilities using the same equipment.

More specifically, the present invention comprises the following hardware and operates as follows. Assume that there are two locations, node A and node B. Both locations have either a Type 1 or a Type 2 encryption algorithm available from the National Security Agency. When node A wishes to transmit information on a media such as a tape or a disk, for example, to Node B, the information on the media is encrypted with a public key known to B and a private key known to A. After the media is delivered to node B, node B uses the public key known to A and the private key known to B to decrypt the information on the media. Anyone else who obtains the media or makes a copy of it during its transit will not be able to carry out the decryption because he or she does not have the private keys of either node A or node B.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 1 illustrates a secure, mobile, data storage apparatus in accordance with the principles of the present invention; and FIG. 2 illustrates a flow diagram representative of one method of secure data storage and transmission in accordance with the principles of the present invention.

DETAILED DESCRIPTION

Referring to FIG. 1, a secure, mobile, data storage apparatus 10 in accordance with the principles of the present invention is shown. The secure, mobile, data storage apparatus 10 comprises a first computer 11 (System A or Node A) employed by a first user that is coupled to a first encryption/decryption device 12 that is adapted to encrypt data stored on a media 13, shown as a floppy disk 13. The first encryption/decryption device 12 may be a type 1 or type 2 encryption device which is readily available from the National Security Agency for secure facilities within their jurisdiction.

The first encryption/decryption device 12 is adapted to encrypt the data on the media using a type 1 or a type 2 encryption algorithm, both of which are well known in the art. Then, using either the type 1 or type 2 encryption algorithm, the data on the media 13 is encrypted. The data on the media 13 is encrypted using a public key known to B and a private key known to A. Then, the media 13 is physically transmitted to Node B at a second location.

At the Node B location, a second computer 21 (System B) employed by a second user is coupled to a second encryption/decryption device 22 that is adapted to decrypt the encrypted data stored on the media 13. Using the appropriate type 1 or type 2 decryption algorithm, the data on the media 13 is decrypted at the Node B location. The data on the media 13 is decrypted using a public key known to A and a private key known to B. Anyone else who obtains the media or who makes a copy of the media during the transit period will not be able to carry out the decryption of the data because they do not have the appropriate keys of either A or B.

The present invention provides for a novel use of the public key encryption algorithm for securing information stored on media in order to transport it to a different location without the need to carry a key for decryption. The algorithm employed in the present invention to transport the classified storage media from one location to another has been developed and certified by the National Security Agency and may be employed to carry or transmit information up to TOP SECRET/-SCI.

Consequently, using the algorithm employed in the present invention, the encrypted information may safely be carried out of a protected location without the usual physical and procedural .complications associated with hand carrying classified information. Media to be transported include such items as a floppy disk or a large disk pack. At the destination location, the decryption key is derived from the information transmitted on the media and the local private key. Only personnel at the proper source and the proper destination have the ability to derive the encryption and decryption keys. In addition to using the algorithm for encrypting information to be carded in communication networks, it may also be used for file encryption. The present invention thus offers additional sen,ices and capabilities using the same equipment.

More specifically, the apparatus of the present invention comprises the following hardware and operates as follows. Assume that there are two locations, node A and node B. Both locations have either a Type 1 or a Type 2 encryption algorithm available from the National Security Agency. When node A wishes to transmit information on a media such as a tape or a disk, for example, to Node B, the information on the media is encrypted with a public key known to B and a private key known to A. After the media is delivered to node B, node B uses the public key known to A and the private key known to B to decrypt the information on the media. Anyone else who obtains the media or makes a copy of it during its transit will not be able to carry out the decryption because he or she does not have the private keys of either node A or node B. The use of present invention precludes the necessity of transmitting numerous sets of keys to each location (node a and node B). In addition, the storage media may be transmitted by commercial courier or U.S. Mail to each location.

FIG. 2 illustrates a flow diagram representative of one specific method 30 of secure data storage and transmission in accordance with the principles of the present invention. The method 30 of transmitting data between the first user and the second user in a secure manner comprises the following steps. The first step 31 comprises providing a transportable data storage medium having data stored thereon. The second step 32 comprises encrypting data stored on the transportable data storage medium using a public key known to the second user and a private key known to the first user to provide for encrypted data stored on the medium. The third step 33 comprises transporting the transportable data storage medium having the encrypted data stored thereon to the second user. The fourth step 34 comprises decrypting the encrypted data stored on the transportable data storage medium using a public key known to the first user and a private key known to the second user. The above-disclosed types of encryption and decryption algorithms may be employed in the method 30 as has been described above.

Thus there has been de:scribed new and improved apparatus and methods that provides for secure, mobile, data storage and transmission to a remote location. It is to be understood that the above-described embodiments are merely illustrative of some of the many specific embodiments which represent applications of the principles of the present invention. Clearly, numerous and varied other arrangements may be readily devised by those skilled in the art without departing from the scope of the present invention.

What is claimed is:

1. A method of ensuring the security of data transferred from a sender to a receiver when said data is to be transported in a transportable electronic storage medium by the physical transport of said electronic storage medium, said sender having a first public key/first private key cryptosystem key pair and said receiver having a second public key/second private key cryptosystem key pair, comprising the steps of:

(a) said sender sequentially encrypting said data with said second public key of the receiver and thereafter with the first private key of the sender and storing said encrypted data on said transportable electronic storage medium, said sender using a type 1 encryption/decryption algorithm for said encryption;

(b) transporting said transportable electronic storage medium from said sender to said receiver;

(c) said receiver sequentially decrypting data stored on the transportable electronic storage medium with the first public key of said sender and thereafter with the second private key of the receiver to provide data in its state prior to encryption in step (a), said receiver using said type 1 encryption/decryption algorithm for said decryption.

2. A method of ensuring the security of data transferred from a sender to a receiver when said data is to be transported in a transportable electronic storage medium by the physical transport of said electronic storage medium, said sender having a first public key/first private key cryptosystem key pair and said receiver having a second public key/second private key cryptosystem key pair, comprising the steps of:
  (a) said sender sequentially encrypting said data with said first private key of the sender and thereafter with the second public key of the receiver and storing said encrypted data on said transportable electronic storage medium; said sender using a type 1 encryption/decryption algorithm for said encryption and decryption
  (b) transporting said transportable electronic storage medium from said sender to said receiver;
  (c) said receiver sequentially decrypting data stored on the transportable electronic storage medium with the second private key of the receiver and thereafter with the first public key of the sender to provide data in its state prior to encryption in step (a), said receiver using said type 1 encryption/decryption algorithm for said decryption.

3. A method of ensuring the security of data transferred from a sender to a receiver when said data is to be transported in a transportable electronic storage medium by the physical transport of said electronic storage medium, said sender having a first public key/first private key cryptosystem key pair and said receiver having a second public key/second private key cryptosytem key pair, comprising the steps of:
  (a) said sender sequentially encrypting said data with said second public key of the receiver and thereafter with the first private key of the sender and storing said encrypted data on said transportable electronic storage medium, said sender using a type 2 encryption/decryption algorithm for said encryption;
  (b) transporting said transportable electronic storage medium from said sender to said receiver;
  (c) said receiver sequentially decrypting data stored on the transportable electronic storage medium with the first public key of said sender and thereafter with the second private key of the receiver to provide data in its state prior to encryption in step (a), said receiver using said type 2 encryption/decryption algorithm for said decryption.

4. A method of ensuring the security of data transferred from a sender to a receiver when said data is to be transposed in a transportable electronic storage medium by the physical transport of said electronic storage medium, said sender having a first public key/first private key cryptosystem key pair and said receiver having a second public key/second private key cryptosystem key pair, comprising the steps of:
  (a) said sender sequentially encrypting said data with said first private key of the sender and thereafter with the second public key of the receiver and storing said encrypted data on said transposable electronic storage medium; said sender using a type 2 encryption/decryption algorithm for said decryption.
  (b) transporting said transportable electronic storage medium from said sender to said receiver;
  (c) said receiver sequentially decrypting data stored on the transposable electronic storage medium with the second private key of the receiver and thereafter with the first public key of the sender to provide data in its state prior to encryption in step (a), said receiver using said type 2 encryption/decryption algorithm for said deception.

* * * * *